United States Patent
Orimo et al.

(10) Patent No.: US 11,273,366 B1
(45) Date of Patent: Mar. 15, 2022

(54) INFORMATION PROCESSING SYSTEM, GAME PROGRAM, AND INFORMATION PROCESSING METHOD

(71) Applicant: Akatsuki Inc., Shinagawa-ku (JP)

(72) Inventors: Kensei Orimo, Shinagawa-ku (JP); Keito Sato, Shinagawa-ku (JP); Shunki Abe, Shinagawa-ku (JP)

(73) Assignee: Akatsuki Inc., Shinagawa-ku (JP)

( * ) Notice: Subject to any disclaimer, the term of this patent is extended or adjusted under 35 U.S.C. 154(b) by 0 days.

(21) Appl. No.: 17/374,821

(22) Filed: Jul. 13, 2021

(30) Foreign Application Priority Data

Aug. 26, 2020 (JP) .............................. JP2020-142246

(51) Int. Cl.
| | |
|---|---|
| A63F 13/20 | (2014.01) |
| A63F 13/52 | (2014.01) |
| A63F 9/06 | (2006.01) |
| A63F 13/822 | (2014.01) |

(52) U.S. Cl.
CPC .......... *A63F 9/0612* (2013.01); *A63F 13/822* (2014.09)

(58) Field of Classification Search
None
See application file for complete search history.

(56) References Cited

FOREIGN PATENT DOCUMENTS

| | | | |
|---|---|---|---|
| JP | 2004033437 A | 2/2004 | |
| JP | 2005287771 A | 10/2005 | |
| JP | 2012090648 A | 5/2012 | |
| JP | 2012205654 A | 10/2012 | |
| JP | 2014061042 A | 4/2014 | |
| JP | 2018187238 A | 11/2018 | |
| JP | 2019063608 A | 4/2019 | |
| JP | 2020078721 A | 5/2020 | |

OTHER PUBLICATIONS

"Wikipedia Katarmari Damacy". From Wikipedia, The Free Encylopedia. [online], [retrieved on Sep. 10, 2021]. Retrieved from the Internet <URL:https://en.Wikipedia.org/w/index.php?title=Katamari_Damacy&oldid=973783544>. 12 pages.*
"IGN Review Katamari Damacy", [dated Dec. 13, 2018], [online], [retrieved Sep. 10, 2021]. Retrieved from the Internet <URL:https://www.ign.com/articles/2004/09/16/katamari-damacy>. 8 pages.*
Notice of Reason for Refusal dated Jun. 3, 2021 for related JP Patent Application No. 2021-060790.
Notification of Reasons for Refusal dated Oct. 22, 2020 for related JP Patent Application No. 2020-142246.

* cited by examiner

*Primary Examiner* — Lawrence S Galka

(57) ABSTRACT

In order to provide an unprecedented puzzle game, the present invention is an information processing system for executing a first puzzle game and a second puzzle game, the information processing system comprising: a first puzzle presentation unit that presents the first puzzle game on a game screen; a piece conversion unit that generates piece information concerning a piece that can be used in the second puzzle game, in accordance with the part information concerning a part generated by a player as a result of the first puzzle game; and a second puzzle presentation unit that presents the piece information together with the second puzzle game.

9 Claims, 8 Drawing Sheets

A part acquired in a first puzzle game

A piece that can be used in a second puzzle game

FIG. 2
Clear !
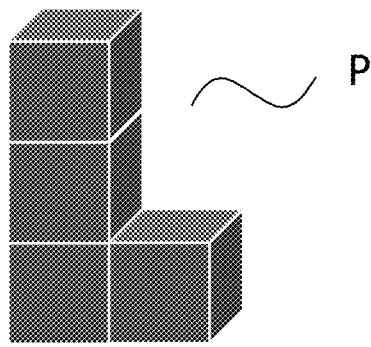 ～ P
FIG. 3
A part acquired in
a first puzzle game
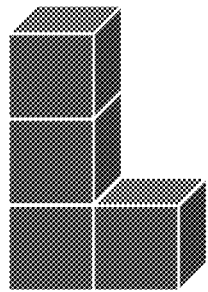  
A piece that can be used in
a second puzzle game

FIG. 6
Part information
| | |
|---|---|
| 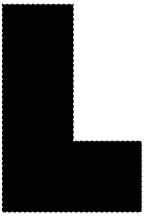 | First puzzle game: Stage 2<br>Oct 8$^{th}$, 2020  11:30<br>. . .<br>. . .<br>. . . |
|  | First puzzle game: Stage 3<br>Oct 10$^{th}$ , 2020  12:02<br>. . .<br>. . .<br>. . . |

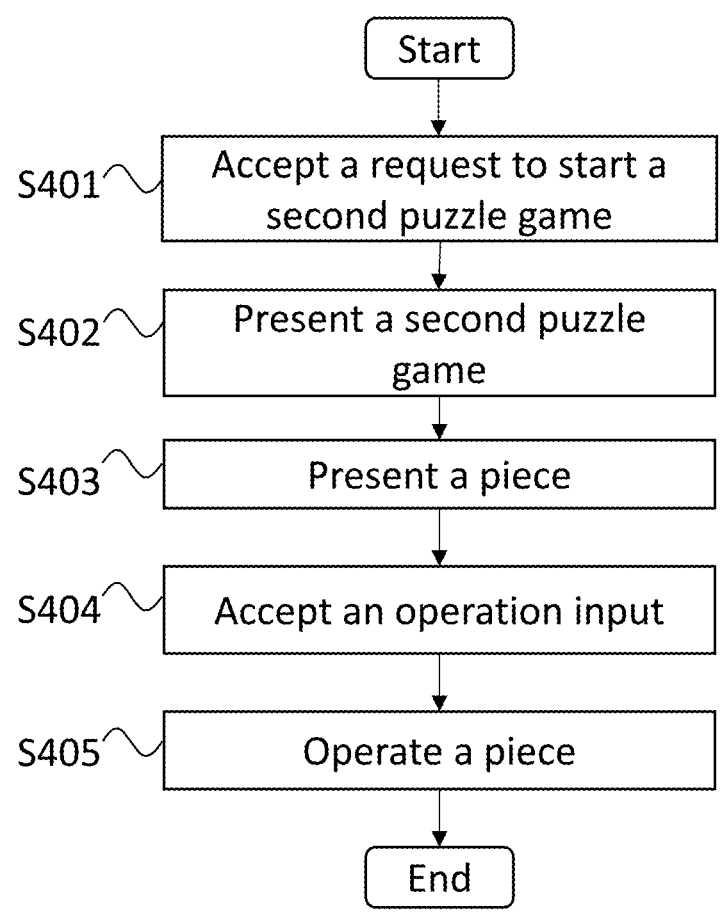

INFORMATION PROCESSING SYSTEM, GAME PROGRAM, AND INFORMATION PROCESSING METHOD

TECHNICAL FIELD

The present invention relates to an information processing system, a game program, and an information processing method.

BACKGROUND ART

With the popularization of electronic devices such as smartphones and tablet terminals, games for the electronic devices have been actively developed in addition to games for home-use game machines. In particular, various puzzle games exist as games for electronic devices.

Patent Literature 1 discloses a game program in which a plurality of parts are moved to complete a predetermined image.

PRIOR ART

Patent Literature

Patent Literature 1: Japanese Unexamined Patent Publication No. 2019-63608

SUMMARY OF THE INVENTION

Technical Problem

By simply completing a fixed target image as in the above technique, the trial and error of a player are hardly induced, and the game becomes monotonous.

Therefore, it is an object of the present invention to provide a puzzle game that requires inventive ideas of the player.

Technical Solution

According to the present invention, an information processing system, a game program, and an information processing method are provided, in which the information processing system for executing a first puzzle game and a second puzzle game comprises: a first puzzle presentation unit that presents the first puzzle game on a game screen; a piece conversion unit 215 that generates piece information concerning pieces that can be used in the second puzzle game, based on part information concerning a part generated by the player as a result of the first puzzle game; and a second puzzle presentation unit 216 that presents the piece information together with the second puzzle game.

Advantageous Effects

According to the present invention, a puzzle game that requires inventive ideas of a player can be provided.

BRIEF DESCRIPTION OF THE DRAWING

FIG. 2 is showing a configuration example of a first puzzle game according to the embodiment of the present invention;

FIG. 3 is showing a configuration example related to piece conversion according to the embodiment of the present invention;

FIG. 6 is showing a configuration example of piece information according to the embodiment of the present invention;

FIG. 8 is a diagram showing an example of a processing flow according to the embodiment of the present invention.

DETAILED DESCRIPTION OF THE EMBODIMENTS

Figure 1A:
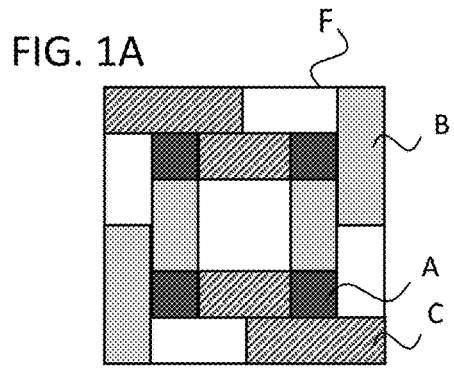
FIGS. 1A to 1H are showing configuration examples of a first puzzle game according to the embodiment of the present invention.

The contents of the embodiment of the present invention will be listed and described. The present invention has the following configuration.

[Item 1]

An information processing system for executing a first puzzle game and a second puzzle game, the information processing system comprising:

a first puzzle presentation unit that presents the first puzzle game on a game screen;

a piece conversion unit that generates piece information concerning pieces that can be used in the second puzzle game, based on part information concerning a part generated by the player as a result of the first puzzle game; and a second puzzle presentation unit that presents the piece information together with the second puzzle game.

[Item 2]

The information processing system as set forth in Item 1, wherein the piece conversion unit generates the piece information based on the shape of the parts.

[Item 3]

The information processing system as set forth in Item 1 or 2, wherein the first puzzle game generates a part of an arbitrary shape by moving a plurality of objects by a player operation.

[Item 4]

The information processing system as set forth in any of Items 1 to 3, wherein the second puzzle game is a puzzle game that can be cleared by combining a plurality of pieces and filling a frame having a predetermined shape.

[Item 5]

A game program for executing a first puzzle game and a second puzzle game by allowing a computer, comprising:

a first puzzle presentation processing that presents the first puzzle game on a game screen;

a piece conversion processing that generates piece information concerning a piece that can be used in the second puzzle game, based on part information concerning a part generated by the player as a result of the first puzzle game, and a second puzzle presentation processing that presents the piece information together with the second puzzle game.

[Item 6]

An information processing method for executing a first puzzle game and a second puzzle game, the information processing method by computer, comprising:

a first puzzle presentation step of presenting the first puzzle game on a game screen;

a piece conversion step that generates piece information concerning pieces that can be used in the second puzzle game, based on part information concerning a part generated by the player as a result of the first puzzle game; and a second puzzle presentation step of presenting the piece information together with the second puzzle game.

Hereinafter, embodiments of the present invention will be described with reference to the drawings.

The present invention provides a first puzzle game, and a second puzzle game related to the first puzzle game, and uses a part obtained by playing the first puzzle game as a piece in the second puzzle game.

FIG. 1 is showing a configuration example of a first puzzle game according to the embodiment of the present invention. FIG. 1A is a start screen of the first puzzle game. In the examples of FIGS. 1A-1H, three types of objects A, B, and C that fit into a frame F having a predetermined shape (a quadrangle in FIGS. 1A-1H) are arranged in the first puzzle game. In FIGS. 1A-1H, the respective objects A, B, and C are displayed so as to be distinguished by color patterns. Objects A, B, and C each have different attributes. The attribute may be a restriction regarding, for example, a movable direction, a movable range, a distance capable of moving at one time, and the like. In the example of FIGS. 1A-1H, the object A can move in the up/down and left/right directions within the fame (F), the object B can move only in the up/down direction, and the object C can move only in the left/right direction. Further, the objects B and C can be erased by moving them to the outside of the frame. In addition, each object cannot move when other objects or other obstacles exist in front of it in the moving direction. The player moves each object, with an ultimate purpose in the first puzzle game being to combine a plurality of objects A into an arbitrary shape.

Figure 1E:
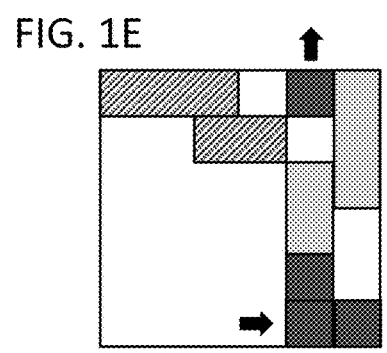
Figure 1B:
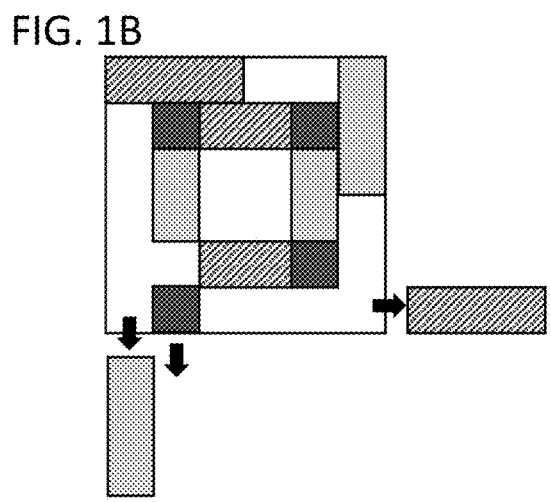
Figure 1F:
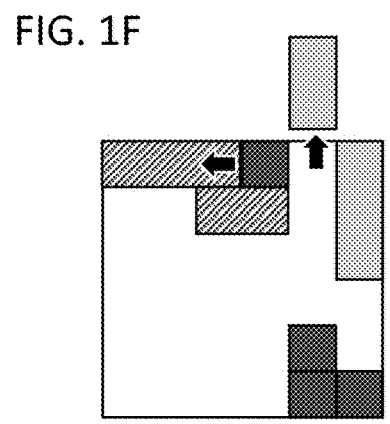
Figure 1C:
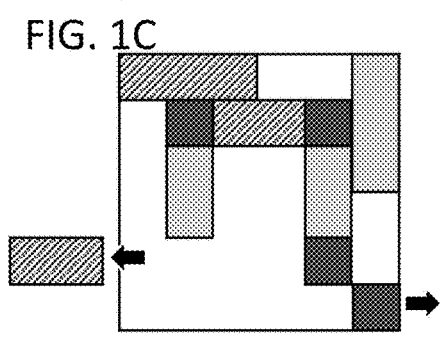

FIG. 1B shows that the lower right object C is moved to the right, the lower left object B is moved down to be erased, and the lower left object A is moved down by one square. In FIG. 1C, object C, which was in the lower center, is now able to move to the left because there is no longer an obstacle in the forward direction due to the movement of object A. Therefore, object C is moved to the left, and object A, which was moved in FIG. 1B, is moved to the right end.

Figure 1G:
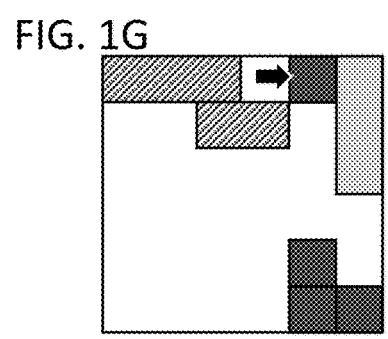
Figure 1D:
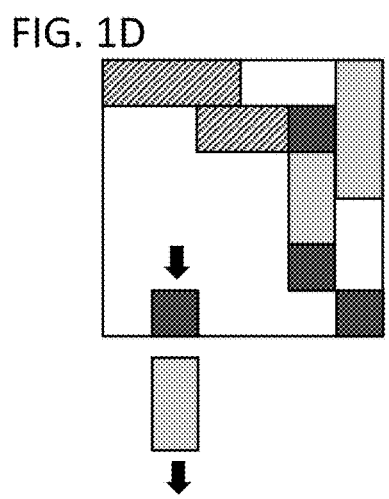

FIG. 1D shows that the object B located in the left center is moved down, and then the object A in the upper left is moved to the lower end. Next, FIG. 1E shows that the object A, which was moved to the lower end in the previous step, is moved to the right so as to be in contact with the other two objects A, and that the object A, which was located in the upper right, is moved up by one square. FIG. 1F shows that the object A, which was located in the upper right, is further moved one square to the left to the left, and the object B, which was located in the right center, is moved upward to be erased. The object B can be moved without any obstacle in the upward direction because the object A was moved one square to the left.

FIG. 1G shows that the object A, which was on the upper right, is moved back by one square to the right. Finally, FIG. 1H shows a state in which the object A on the upper right is moved downward and the four objects A are lined up in the L-shaped part.

Figure 1H:
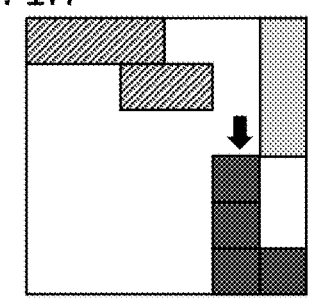

FIG. 2 is an example of a clear screen of the first puzzle game shown in FIG. 1, and shows that the combined shape of the objects A obtained in FIG. 1H is taken out as one part, P. As described above, in the first puzzle game, the objects A, B. and C are moved in order to obtain one part by combining the plurality of objects A. Depending on the player's intention, the combination layout of the objects A can be changed to obtain a part P having a different shape. Since the part obtained by combining the objects A is used in a second puzzle game described later, the player operates while considering the shape of the combination of the objects A so that he/she can have an advantage in the second puzzle game or can acquire the pieces that are essential for clearing the second puzzle game.

Further, the first puzzle game illustrated in FIG. 1 is not limited to the above description. For example, the object may be an object having different features in addition to the above three types, and the number of types is not limited to three. Further, it is possible to add a gimmick that has a predetermined effect, such as restricting the movement of an object. Further, the obtained part may not be limited only to one, and two or more parts may be obtained. Further, the puzzle may be a puzzle capable of moving the object three-dimensionally.

The part P composed of the objects A obtained in the first puzzle game becomes each puzzle piece in the second puzzle game. The part P obtained in the first puzzle game is converted into a puzzle piece that can be used in the second puzzle game. The processing converting into the second puzzle piece is performed based on a predetermined rule. FIG. 3 shows that the part P in which the above-mentioned three objects A are connected vertically and one object is further connected horizontally is converted into an L-shaped piece in the second puzzle game.

Figure 4A:
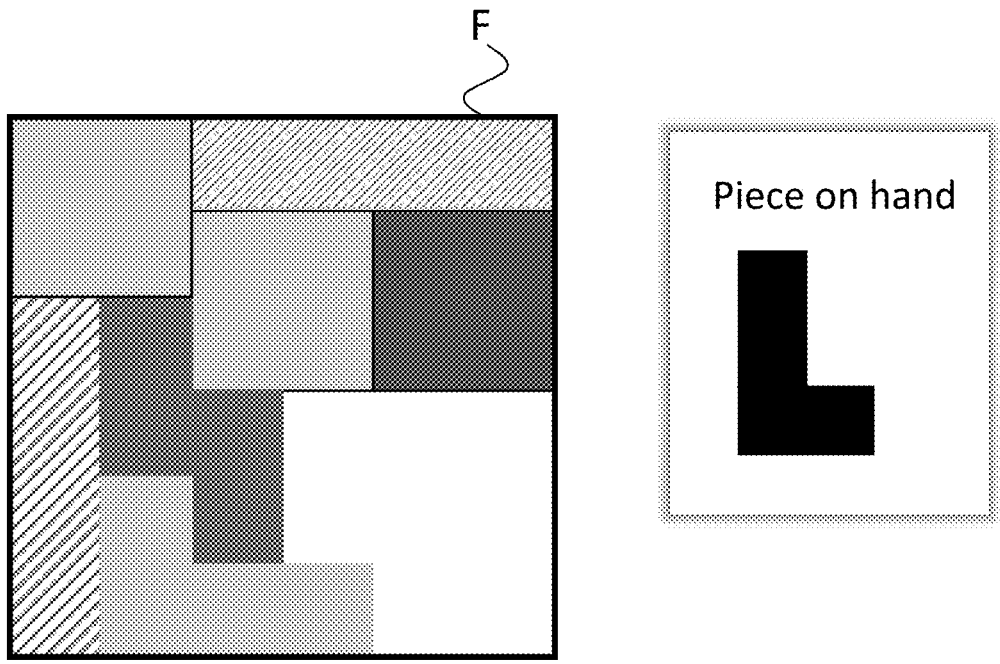
FIGS. 4A and 4B are showing configuration examples of a second puzzle game according to the embodiment of the present invention.
Figure 4B:
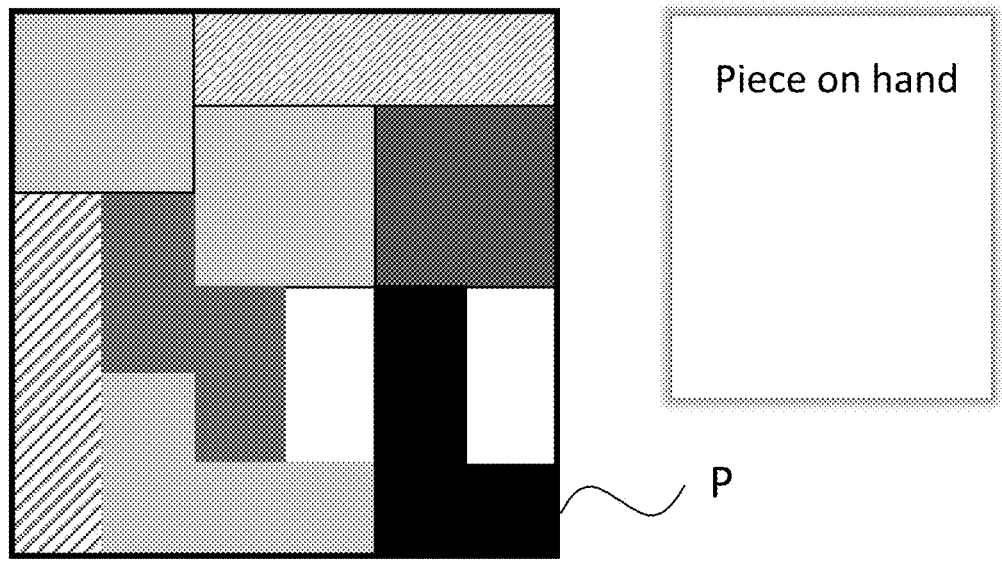

FIGS. 4A-4B is an example of a second puzzle game according to the embodiment of the present invention. The second puzzle game illustrated in FIGS. 4A-4B is configured so as to fit a puzzle piece of a predetermined shape into a frame F of a predetermined shape, and the game is cleared when the inside of the frame F is buried with puzzle pieces without any gap. The part P composed of the objects A obtained in the first puzzle game becomes each puzzle piece in the second puzzle game. FIG. 4A shows a state in which a plurality of puzzle pieces are already fitted in the frame F and the puzzle can be cleared when a blank portion in the lower right is filled. A piece based on the part P obtained in the first puzzle game is displayed so as to be selectable as a "hand-held piece". FIG. 4B shows a state in which the piece based on the part P acquired in FIG. 3 is fitted in the frame F in the second puzzle game.

The foregoing is an example of the first and second puzzle games according to the present invention. The first and second puzzle games in the present invention are not limited to the examples described herein, but since the part acquired in the first puzzle game becomes a piece of the second puzzle game, the player strategically plays the first puzzle game while remembering features such as the shape, color, and such of the pieces needed to clear the second puzzle game.

<Player Terminal 1>

Figure 5:
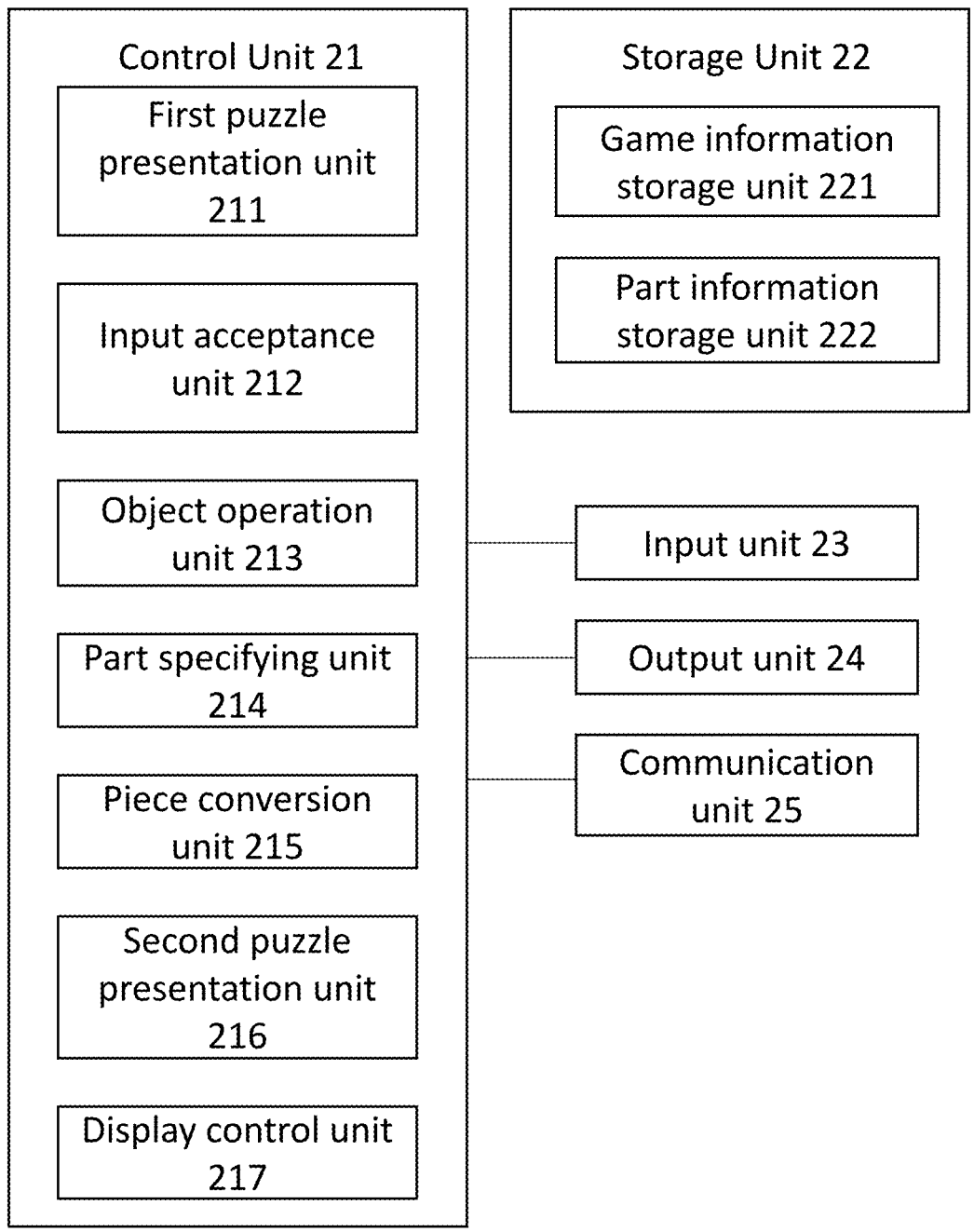
FIG. 5 is showing a configuration example of a player terminal according to the embodiment of the present invention.

FIG. 5 is a block diagram showing the functional configuration of a player terminal 1. The player terminal 1 is an information processing device (for example, a smartphone, a mobile phone terminal, a tablet terminal) that the player can possess and use. The player terminal 1 has a control unit 21 that controls the entire player terminal 1, a storage unit 22 that stores various data programs, an input unit 23 in which the player performs an operation input, an output unit 24 that outputs game screen, operation screen, and the like, and a communication unit that performs an information communication with a server device 25.

The control unit 21 of this embodiment includes at least a first puzzle presentation unit 211, an input acceptance unit 212, an object operation unit 213, a part specifying unit 214, a piece conversion unit 215, a second puzzle presentation unit 216, and a display control unit 217. Further, the storage unit 22 includes at least a game information storage unit 221 and a part information storage unit 222. Each functional unit of the control unit 21 can be realized by executing a program stored in the memory or the game information storage unit 221 by the CPU.

The game information storage unit 221 stores at least a game program related to the first puzzle game and the second puzzle game. The game program may be, for example, downloaded from a server device. Each can have multiple stages. Further, in addition to the program body, character images and the like necessary for the progress of the game are appropriately included.

The first puzzle game is a puzzle game that generates a part having a predetermined feature as a result of play. The specific game structure is not particularly limited. The part generated in one play may be one, or it may be two or more. The feature of the part is specified by a predetermined shape, size, color, pattern, number or letter, picture, etc. In particular, it is preferable that the shape, size, color, pattern, number, letter, and/or picture of the obtained part can be changed in accordance with the operation of the player. The first puzzle game may be, for example, a puzzle game which is intended to generate an object having a desired shape by combining a plurality of objects, as illustrated in FIG. 1. In addition, while a plurality of objects is sequentially moving from the first direction to the second direction of the screen, a type of puzzle game (so-called dropping game) that is played by changing the direction and arrangement by the player operation, Rubik's Cube (registered trademark), three-dimensional puzzle, jigsaw puzzle, picture matching puzzle, picture drawing puzzle, character matching puzzle, or any puzzle game may be used.

The second puzzle game is a puzzle game which can be played by combining the parts specified by a predetermined shape, size, color, pattern, number, letter, picture, etc. The specific game structure is not particularly limited. For example, as illustrated in FIG. 4, a puzzle game of a type in which a frame having a predetermined shape is buried by combining a plurality of pieces may be used. In addition, while a plurality of objects are sequentially moving from the first direction to the second direction of the screen, a type of puzzle game (so-called dropping game) that is played by changing the direction and arrangement by the player operation, Rubik's Cube (registered trademark), three-dimensional puzzle, jigsaw puzzle, picture matching puzzle, picture drawing puzzle, character matching puzzle, or any puzzle game may be used. Further, the second puzzle game is not limited to a game having a specific clearing condition (such as burying the entire frame with pieces as shown in FIG. 4), and may be a game in which the player can freely express his/her favorite shape, color, and pattern by combining a plurality of pieces without setting the specific clearing condition.

The first puzzle presentation unit 211 displays the first puzzle game on the player terminal screen in response to the player's request. The first puzzle presentation unit 211 reads and outputs the first puzzle game information of a predetermined stage from the game information storage unit 221.

The input acceptance unit 212 of the player terminal 1 accepts an operation related to the game from the player. The input acceptance unit 212 accepts, for example, a touch operation using the input unit 23 by the player. In the embodiment of the present invention, the input unit 23 may be a touch panel capable of detecting multi-touch. The input unit 23 includes a device capable of detecting a position designated by a touch operation, and outputs coordinate information corresponding to the designated position to the input acceptance unit 212. Then, the input acceptance unit 212 outputs the accepted operation content to the object operation unit 213.

The object operation unit 213 changes the state of the object in response to an operation from the player. For example, in response to an operation of moving an object, the object is moved by a predetermined distance, and in response to an operation of rotating an object, the object is rotated by a predetermined angle. Also, when the object has restrictions on state changes such as movement and rotation, the object is not changed if the player's operation is contrary to restriction. For example, the example shown in FIG. 1 has the limitations that the object A cannot be moved to the outside of the frame F, the object B can be moved in the only up/down direction, and the object C can be moved in the only left/right direction. Thus, when the player performs an operation contrary to these restrictions, the object cannot be moved. Instead of not changing the state of the object, it may display a given effect indicating that it is contrary to the restrictions.

The part specifying unit 214 specifies the characteristics of the part generated as a result of the first puzzle game. The characteristics of the part are specified by a predetermined shape, size, color, pattern, number, letter, picture, etc. In the example of FIG. 3, as a result of the first puzzle game, an L-shaped part was generated. The part specifying unit 214 specifies characteristics such as the shape, size, color, and pattern of the L-shaped part based on a predetermined rule. The specified part information may be stored in the part information storage unit 222.

The piece conversion unit 215 converts the characteristics to the parameters of the pieces in the second puzzle game based on the characteristics of the parts specified by the part specifying unit 214. As shown in FIG. 3, when converting the part generated by the first puzzle game into a piece in the second puzzle game, the parameters of the piece that can be used in the second puzzle game are determined by applying feature parameters such as part shape, size, color, pattern, numbers, character, picture, etc. to predetermined rules. The rules at the time of conversion may be constant, or may change depending on the timing, other play conditions, and the like. The example of FIG. 3 shows that the part P in which the above-mentioned objects A are connected by three vertically, and further connected by one horizontally is converted into an L-shaped piece in the second puzzle game. The feature parameters of the converted piece set by the part conversion unit are stored in the part information storage unit 222.

The part information storage unit 222 may appropriately include information on the features of the part specified by the part specifying unit 214, and/or information on the features of the piece after conversion by the piece conversion unit 215, or information such as the game stage, the date and time on which the part was generated. FIG. 6 is a configuration example of part information stored in the part information storage unit 222. Information about the features of the part or the piece includes, for example, information such as shape, size, color, pattern, number, letter, picture, etc. The part information storage unit 222 can include information about one or more parts. The player may be able to acquire and keep a plurality of parts by playing the first puzzle game. The acquired parts may set a term of validity. In that case, for example, a part for which a predetermined term (24 hours or the like) has lapsed after acquisition may be deleted from the part information storage unit 222 so that it cannot be used in the second puzzle game. Further, the acquired part may have restrictions set on it regarding the second puzzle game that can be used as a piece. The restriction is, for example, that the second puzzle game can be used only in a specific stage, or can be used only when a specific condition is met.

The second puzzle presentation unit 216 displays the second puzzle game on the player terminal in response to the player operation. The second puzzle presentation unit 216 reads and outputs information of the second puzzle game from the game information storage unit 221. The second puzzle game can be sequentially proceeded in accordance with progress of the first puzzle game, and can be stored in the game information storage unit 221 in the middle of play. That is, after playing the first puzzle game one or more times, the second puzzle game can be proceeded, and the first puzzle game can be played again in order to collect pieces. The second puzzle presentation unit 216 reads and displays a second puzzle game in the latest play state of the player. For example, FIG. 4A shows that the pieces were buried halfway through the previous operation and were read and displayed again after the part was generated by the first puzzle game.

The second puzzle presentation unit 216 further presents the piece information stored in the part information storage unit 222. FIGS. 4A-4B display images of a piece held by the player as a "piece on hand" on the player terminal. When the part information storage unit 222 holds multiple pieces' information, a plurality of piece images may be displayed in the "piece on hand" column.

The input acceptance unit 212 of the player terminal 1 accepts the player's operation in the second puzzle game. The player performs an input operation such as an operation of selecting an arbitrary piece from the piece on hand column and an operation of selecting a place to fit the piece in the second puzzle game. Further, the other operations such as rotating the piece may be possible as appropriate. The input acceptance unit 212 outputs the accepted operation to the object operation unit 213. The object operation unit 213 changes the state of the piece in accordance with the input information. In the example of FIGS. 4A-4B, the selected piece is fitted at a given place (FIG. 4B).

Figure 7:
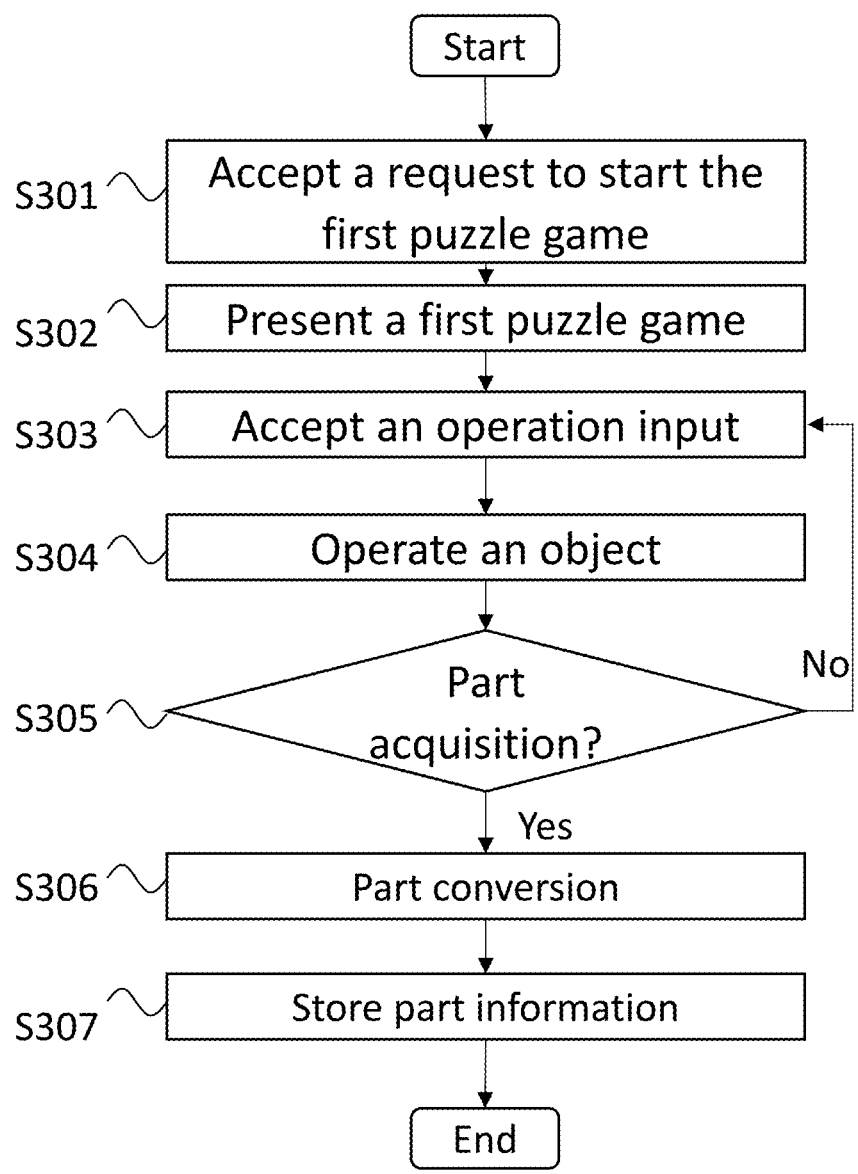
FIG. 7 is a diagram showing an example of a processing flow according to the embodiment of the present invention.

FIG. 7 is a flowchart showing an example of processing which is executed by the player terminal in the first puzzle game. First, the player accepts a request to start the first puzzle game (S301). The first puzzle presentation unit 211 presents a predetermined first puzzle game (S302). The input acceptance unit 212 accepts the input by the player (S303) and operates the object in response thereto (S304).

Next, it is confirmed whether a predetermined part is completed in the first puzzle game (S305). Whether the predetermined part is completed may be automatically determined when the object meets a predetermined condition, and it may be determined based on the fact that the player has input that the part has been completed. For example, in the example shown in FIG. 1, it may be determined that the part is completed on the condition that all the objects A existing on the first puzzle game are combined, and the player may determine that the part has been formed at an arbitrary timing, and may determine that the part has been completed by inputting the part. When a predetermined part is completed (S305=Yes), the part specifying unit 214 specifies the features of the generated part. Further, the piece conversion unit 215 determines the feature parameters of the piece in the second puzzle game based on a predetermined rule (S306). Part information after conversion is stored in the part information storage unit 222 (S307). Part information before conversion may also be stored.

FIG. 8 is a flowchart showing an example of processing which is executed by the player terminal in the second puzzle game. First, the player accepts a request to start a second puzzle game (S401). The second puzzle presentation unit 216 presents a predetermined second puzzle game (S402). Further, information about the piece held by the player is presented (S403). The input acceptance unit 212 accepts the input by the player (S404) and executes the second puzzle game by operating the piece in response thereto (S405).

As described above, according to the puzzle game of the present invention, since the second puzzle game is played using the part generated in the first puzzle game, the first puzzle game can be played while considering various features such as the shape, color, and/or size of the piece required to clear the second puzzle game. Therefore, since a correct answer in the puzzle game is not one, the monotony is reduced, and the player can enjoy the puzzle game for a long time.

The combination of the first puzzle game and the second puzzle game is not particularly limited and may be different puzzle games or puzzle games of the same type. Further, in the case of puzzle games of the same type, the scale of the first puzzle game and the second puzzle game can also be changed (for example, the second puzzle game has a larger scale than the first puzzle game).

(Other Implementation 1)

A time limit may be set in the first puzzle game and the second puzzle game. In that case, the control unit 21 further includes a time limit unit as a functional unit. The time limit unit outputs time information including information about the time limit on the game screen. The time limit unit presents the time limit to the player to count down the time limit in accordance with the time elapsed since the player started the puzzle, and the game can be over when the time limit becomes zero.

(Other Implementation 2)

A limit on the number of operations may be set in the first puzzle game and the second puzzle game. In that case, the control unit 21 further includes an operation number limit unit as a functional unit. The operation number limit unit outputs information about the operation number limit on the game screen. The operation number limit unit presents the operation number limit on the player so that the operation number limit is reduced each time the player moves the object, and the game is over when the operation number limit becomes zero.

(Other Implementation 3)

It may be possible to exchange a piece that can be used in the second puzzle game between the player and another player. The other party of the exchange may be another player who is playing the same game, for example, another player who has a predetermined relationship (registered as a friend, etc.) with the player.

Figure 9A:
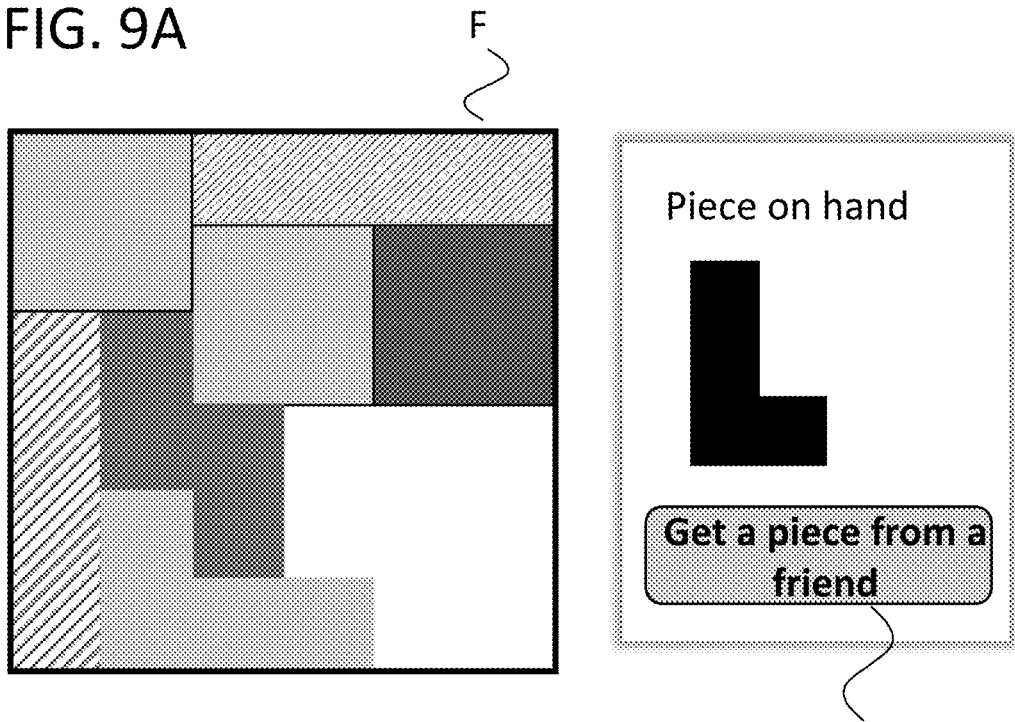
FIGS. 9A and 9B are showing configuration examples of a second puzzle game according to the embodiment of the present invention.
Figure 9B:
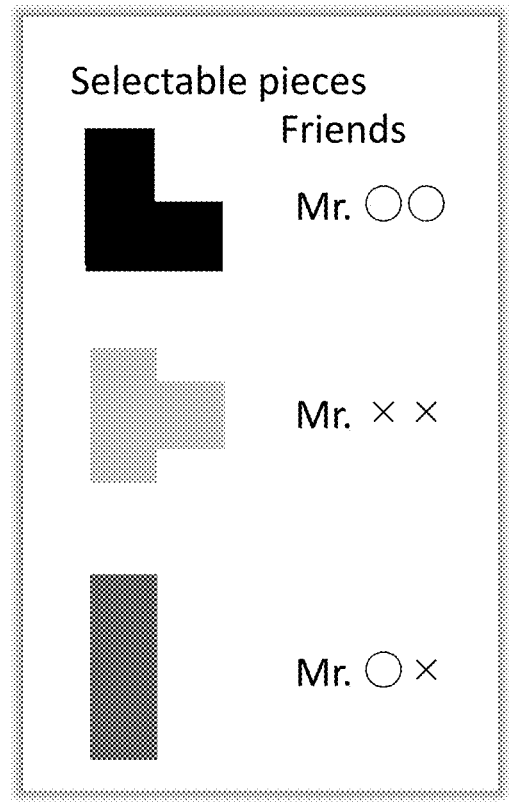

First, the case where a player is the one who receives a piece from another player will be described. FIG. 9A is a display example of the player terminal screen when executing the second puzzle game. For example, in the display column of the piece on hand, a button 31 requesting "get a piece from a friend" is displayed. When the player's piece on hand is inappropriate, the player can tap a button 31 to transmit, to a server, information requesting to view information of selectable pieces of another player. FIG. 9B is a screen display example displaying a list of selectable pieces of other players. The server acquires piece information of another player having a predetermined relationship with the player, and transmits an image of selectable pieces, a player name (friend name) information, and the like to the player terminal. The player terminal generates a list screen based on the received information and displays it on the screen. The player selects and inputs a desired piece, and transmit an acquisition request of the piece to the server. If necessary, the server transmits information inquiring whether it is to be permitted, to the terminal of another player. If permitted by another player, the server transmits information to the player terminal, thus giving information of the target piece to the player, and the server transmits the information to the player terminal. The player terminal adds the information of the piece to the part information storage unit 222.

Further, for the case where the player is the one who grants a piece to other players, the player can select and register a piece that may be given to other players from the piece on hand. Then, when another player requests the granting of a particular piece, the player terminal may display a screen for selecting whether to grant or reject the request. The piece given to other players may be deleted from the piece on hand or may be retained.

In this way, by enabling the exchange of pieces with other players, the breadth of the game can be expanded. In addition, a predetermined restriction may be set on receiving pieces from other players. For example, it is possible to set the number of receivable pieces in a predetermined period, and the unreceivable period from the time when receiving once until the next time when it can be received. Further, it may be possible to require a predetermined item to receive the piece.

(Other Implementation 4)

In the above embodiment, it has been described that the part generated in the first puzzle game is used as a piece in the second puzzle game, but the part generated by executing the second puzzle game may also be used as an object in the continuation of the first puzzle game. And, both puzzles may be cleared by executing multiple exchanges of the generated pieces between the first puzzle game and the second puzzle game. In addition, the part generated in the second puzzle game may be further used as a piece in the third puzzle game. By doing so, the game can be more complex and less boring.

(Other Implementation 5)

In the above embodiment, the configuration (standalone configuration) in which the player terminal executes the processing required to provide the first and second puzzle games to the player has been described, but a configuration (cloud configuration) in which the server executes the above processing and the executed processing result is returned to the player terminal may be adopted.

In that case, the server includes a communication unit that communicates with the player terminal, transmits information on the first and second puzzle games in response to the player's request, and receives input information involved in the player's operation. The control unit of the server also executes the game by changing the object of the puzzle game in accordance with the received input information and transmitting the result to the player terminal. Further, the part information generated in the first puzzle game and/or the piece information obtained by converting the part information into a piece in the second puzzle game can be stored in the storage unit in association with the identification information of the player.

As described above, similar effects can be achieved by having the server handle the processing of the game in the present invention. Further, the processing in the game of the present invention can be appropriately distributed between the player terminal and the server. During the processing, the player terminal and the server may execute the processing, or alternatively, for example, may be arbitrarily determined in accordance with the calculation processing capacity of the player terminal and the server, the communication speed between the player terminal and the server, and the like.

The above-described embodiments are merely examples for facilitating the understanding of the present invention and should not be construed as limiting the present invention. It goes without saying that modification and improvement can be made to the present invention without departing from the spirit thereof, and that an equivalent thereof is included in the present invention.

DESCRIPTION OF REFERENCE NUMERALS

1: player terminal
21: control unit
22: storage unit
23: input unit
24: output unit
25: communication unit

The invention claimed is:

1. An information processing system for executing a first puzzle game and a second puzzle game, the information processing system comprising:
   a first puzzle presentation unit that presents the first puzzle game on a game screen;
   a piece conversion unit that generates piece information concerning a piece that can be used in the second puzzle game, in accordance with part information concerning a part generated by a player as a result of the first puzzle game; and
   a second puzzle presentation unit that presents the piece information together with the second puzzle game,
   wherein the first puzzle game and the second puzzle games are different forms of puzzle games from each other, and
   wherein the first puzzle game includes a plurality of objects movable by the player's operation and at least one of the plurality of objects is movable only in first and second directions that are orthogonal to each other.

2. The information processing system according to claim 1, wherein the piece conversion unit generates the piece information in accordance with a shape of the part.

3. The information processing system according to claim 1, wherein the first puzzle game generates a part of an arbitrary shape by moving the plurality of objects by the player's operation.

4. The information processing system according to claim 1, wherein the second puzzle game is a puzzle game that is cleared by combining a plurality of pieces and filling a frame of a predetermined shape.

5. An information processing system for executing a first puzzle game and a second puzzle game, the information processing system comprising:
   a first puzzle presentation unit that presents the first puzzle game on a game screen;
   a piece conversion unit that generates piece information concerning a piece that can be used in the second puzzle game, in accordance with part information concerning a part generated by a player as a result of the first puzzle game; and a second puzzle presentation unit that presents the piece information together with the second puzzle game, wherein the second puzzle game is a puzzle game that can be cleared by combining multiple pieces to fill a frame of a predetermined shape.

6. A non-transitory computer-readable medium having stored thereon a program that, when executed, causes a processor to perform a method for executing a first puzzle game and a second puzzle game, the method comprising:

presenting the first puzzle game on a game screen;

generating piece information concerning a piece that can be used in the second puzzle game, in accordance with part information concerning a part generated by a player as a result of the first puzzle game; and presenting the piece information together with the second puzzle game, wherein the first puzzle game and the second puzzle games are different forms of puzzle games from each other, and wherein the first puzzle game includes a plurality of objects movable by the player's operation and at least one of the plurality of objects is removable only in first and second directions that are orthogonal to each other.

7. A non-transitory computer-readable medium having stored thereon a program that, when executed, causes a processor to perform a method for executing a first puzzle game and a second puzzle game, the game method comprising:

presenting the first puzzle game on a game screen;

generating piece information concerning a piece that can be used in the second puzzle game, in accordance with part information concerning a part generated by a player as a result of the first puzzle game; and presenting the piece information together with the second puzzle game, wherein the second puzzle game is a puzzle game that can be cleared by combining multiple pieces to fill a frame of a predetermined shape.

8. An information processing method for executing a first puzzle game and a second puzzle game by computer, the information processing method comprising:

a first puzzle presentation step of presenting the first puzzle game on a game screen;

a piece conversion step that generates piece information concerning a piece that can be used in the second puzzle game, in accordance with part information concerning a part generated by a player as a result of the first puzzle game; and a second puzzle presentation step of presenting the piece information together with the second puzzle game, wherein the first puzzle game and the second puzzle games are different forms of puzzle games from each other, and wherein the first puzzle game includes a plurality of objects movable by the player's operation and at least one of the plurality of objects is removable only in first and second directions that are orthogonal to each other.

9. An information processing method for executing a first puzzle game and a second puzzle game by computer, the information processing method comprising:

a first puzzle presentation step of presenting the first puzzle game on a game screen;

a piece conversion step that generates piece information concerning a piece that can be used in the second puzzle game, in accordance with part information concerning a part generated by a player as a result of the first puzzle game; and a second puzzle presentation step of presenting the piece information together with the second puzzle game, wherein the second puzzle game is a puzzle game that can be cleared by combining multiple pieces to fill a frame of a predetermined shape.

\* \* \* \* \*